United States Patent [19]

Baker et al.

[11] Patent Number: 4,680,786

[45] Date of Patent: Jul. 14, 1987

[54] COMMUNICATION SYSTEM FOR PROVIDING BUSINESS COMMUNICATION FEATURES TO CELLULAR MOBILE TELECOMMUNICATION CUSTOMERS

[75] Inventors: Robin C. Baker, Boulder; Steven E. Brown, Arvada; John R. Lothrop, Longmont; Roman Lozyniak, Westminster; Paul E. Miller, Northglenn, all of Colo.

[73] Assignees: AT&T Company; AT&T Information Systems Inc., both of Holmdel, N.J.

[21] Appl. No.: 782,312

[22] Filed: Oct. 1, 1985

[51] Int. Cl.[4] .............................................. H04M 1/00
[52] U.S. Cl. ...................................... 379/60; 379/229; 379/59
[58] Field of Search ............................ 379/59, 60, 229

[56] References Cited

U.S. PATENT DOCUMENTS

| | | | |
|---|---|---|---|
| 4,133,030 | 1/1979 | Huettner et al. | 364/200 |
| 4,247,740 | 1/1981 | Anderson et al. | 379/229 |
| 4,475,010 | 10/1984 | Huensch et al. | 179/2 EB |
| 4,486,628 | 12/1984 | Puhl et al. | 379/60 |
| 4,599,490 | 7/1986 | Cornell et al. | 379/60 |

OTHER PUBLICATIONS

The Bell System Technical Journal (BSTJ), vol. 58, No. 1, Part 3, Jan. 1979, pp. 1-270. Pending application Serial No. 563,254, R. G. Cornell et al, case 3-2-1-1, filed 12/19/83. BSTJ, vol. 43, No. 5, Parts 1 and 2, Sep. 1964, pp. 1831-2609. BSTJ, vol. 62, No. 1, Part 2, Jan. 1983, pp. 167-415.

Primary Examiner—Robert Lev
Attorney, Agent, or Firm—James M. Graziano

[57] ABSTRACT

The subject communication system is an improved cellular mobile telecommunication system which provides business communication features to cellular mobile telecommunication customers.

This is accomplished by using a business communication system as the switch element in the mobile telecommunication office. The master-slave relationship between the mobile telecommunication controller and the system processor that is found in the prior art is replaced by a peer-peer relationship. The mobile telecommunication control functions are handled by the mobile telecommunication controller while the call processing/connection control functions are handled by the system processor. Thus, the existing business communication call processing software can be used directly and any new business communication service provided by the business communication system is also available to the cellular mobile telecommunication customer. The mobile unit is now a "mobile office" and it is treated as any other business communication station set.

14 Claims, 3 Drawing Figures

FIG. 1

COMMUNICATION SYSTEM FOR PROVIDING BUSINESS COMMUNICATION FEATURES TO CELLULAR MOBILE TELECOMMUNICATION CUSTOMERS

TECHNICAL FIELD

This invention relates to business communication and cellular mobile telecommunication systems and more particularly to an arrangement for providing business communication features to cellular mobile telecommunications customers. This is accomplished by using a business communication system as the mobile telecommunication switch element and integrating the mobile telecommunication software with the business communication software.

BACKGROUND OF THE INVENTION

Special purpose telecommunication systems are used to provide a variety of specialized services. One example of such a system is a cellular mobile telecommunication system, which provides the service of connecting mobile telecommunication customers each having a mobile unit to land-based customers who are served by the common carrier public telephone network. In such a system, all incoming and outgoing calls are routed through a mobile telecommunication switching office that is connected to a group of cell sites (radio stations) which communicate with mobile units.

One example of such a prior art special purpose telecommunication system is the Advanced Mobile Phone Service (AMPS) System described in *The Bell System Technical Journal* (BSTJ), V. 58, No. 1, Part 3, January 1979, pp. 1–270. The mobile units are served by radio stations or cell sites, each of which is located in one cell area of a larger region. Each cell site in the region is connected by a group of communication links to the mobile telecommunication switching office. Each cell site contains a group of radio transceivers (transmitter/receivers), and each transceiver is connected to one communication link. Each transceiver operates on a pair of frequencies, one frequency to transmit radio signals to the mobile unit, the other frequency to receive radio signals from the mobile unit.

The first stage of a communication connection is set up when a transceiver in a cell site, operating at a given frequency pair, is turned on and a mobile unit is tuned to the same frequency pair. The second stage of the communication connection is between the communication link connected to this transceiver and the common carrier public telephone network. This second stage of the communication connection is set up in the mobile telecommunication switching office, which is connected to the common carrier public telephone network by incoming and outgoing trunks. The mobile telecommunication switching office contains a switching network to switch a mobile customer's speech signals from the communication link to an incoming or outgoing trunk.

The mobile telecommunication system is controlled by a mobile telecommunication controller at the mobile telecommunication switching office and a cell site controller at each cell site associated with the mobile telecommunication switching office. A plurality of data links connect the mobile telecommunication controller and the associated cell site controllers. The mobile telecommunication controller under control of complex software controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telecommunication controller, control the transceivers at the site. The control processors at each cell site also control the tuning of mobile units.

With today's rapidly moving technology, new and more efficient designs of telecommunication switching systems and processors are continually being evolved and the demand for new specialized business communication services is ever increasing. Prior art cellular mobile telecommunication switching system designs suffer from inflexibility and are difficult to adapt to the use of new, more cost-effective technologies and the offering of new specialized services. For example, to incorporate a new telecommunication switch into an existing cellular mobile telecommunication switching system design, or to adapt this system to offer a new kind of business communication service, usually requires a major design effort. Complex new control software must be designed and/or new interface hardware may be required between the mobile telecommunication controller and the units controlled by that controller.

An advance in the cellular mobile telecommunication field is disclosed in U.S. Pat. No. 4,599,490, wherein a business communication system is used as the switch element in the mobile telecommunication switching ofice. This is a master-slave arrangement wherein the mobile telecommunication controller is used for controlling the communication link to incoming/outgoing trunk connections through the business communication system. The mobile telecommunication controller controls the operations of the radio transceivers, mobile units, and one end of the communication links connecting cell sites to the business communication switching system. The mobile telecommunication controller controls channel selection, paging, mobile alerting, and hand-off operations. A separate business communication system processor, in the business communication switching system, controls the setting up of a connection in a switching network between the incoming and outgoing trunks to the common carrier public telephone network and the communication links to the cell sites. A data link interconnects the mobile telecommunication controller and the business communication system processor. When the business communication system processor receives incoming mobile call data from the common carrier public telephone network, it sends identification data corresponding to the incoming identity code to the mobile telecommunication controller. The mobile telecommunication controller controls the setting up of a connection between a mobile unit corresponding to the identification data and a selected one of the communication links which connect the cell sites with the business communication switching system. The mobile telecommunication controller controls the remainder of the connection by sending the identification of the selected communication link to the business communication switching system, which sets up a connection between the selected cell site communication link and the incoming trunk from the common carrier public telephone network associated with the incoming call.

In this system, a small group of primitive commands is exchanged between the business communication switching system and the mobile telecommunication controller. Advantageously, the use of such primitive commands permits any modern program-controlled business communication switching system to be readily adapted to communicate in a standard way with and to be responsive to commands from the mobile telecommunication controller. Thus, different business communication system processors and mobile telecommunication controllers, each controlling their own associated equipment, can easily be interconnected. For example, using this arrangement, a complete mobile telecommunication system can be formed using a standard mobile telecommunication controller and using any manufacturer's adapted modern program-controlled business communication switching system.

SUMMARY OF THE INVENTION

The subject communication system is an improved cellular mobile telecommunication system which provides business communication features to cellular mobile telecommunication customers. The prior art cellular mobile telecommunication systems provided basic telephone service which involved simply connecting a calling party to a called party. The communication system of the present invention provides the full spectrum of business communication features to the mobile telecommunication customer.

This is accomplished by using a business communication system as the switch element in the mobile telecommunication office. The master-slave relationship between the mobile telecommunication controller and the system processor that is found in the prior art is replaced by a peer-peer relationship. The mobile telecommunication control functions are handled by the mobile telecommunication controller while the call processing/connection control functions are handled by the system processor. Thus, the existing business communication call processing software can be used directly and any new business communication service provided by the business communication system is also available to the cellular mobile telecommunication customer. The mobile unit is now a "mobile office" and it is treated as any other business communication station set.

In this communication system, a hardware and software cellular communication interface is provided between the mobile telecommunication controller and the system processor. This interface creates a "pseudo-station" for each of the mobile units so that the system processor can use the existing call processing software to provide business communication services to the mobile units. In this manner, only minimal modifications are necessary in the mobile telecommunication controller and the system processor to provide all the business communication services to the cellular mobile telecommunication customers. The cellular communication interface itself contains a processor that coordinates the exchange of messages between the mobile telecommunication controller and the system processor.

The business communication system call processing software contains a few basic routines (request for service, digit collection, digit sending, network operations, external operations, disconnect) which account for the majority of the processing of the system processor. These call processing routines are table driven in that station definition, status and activity are all recorded in a table indexed by station number. The cellular communication interface translates all messages concerning mobile units from the mobile telecommunication controller into station status data to populate the status memory entry associated with the mobile unit's pseudo-station number. This translation process enables the business communication system processor to use the existing call processing routines to provide business communication services to mobile units. In complementary fashion, the cellular communication interface translates all pseudo-station status memory updates from the system processor into either control/data messages which are transmitted to a mobile unit or requests for a connection between a communication link and a mobile unit. The cellular communication interface thereby integrates two disparate systems into a coordinated entity without requiring significant modification to either existing system.

BRIEF DESCRIPTION OF THE DRAWING

The invention may be better understood from the following description when read with reference to the drawing in which.

DETAILED DESCRIPTION

Figure 1:
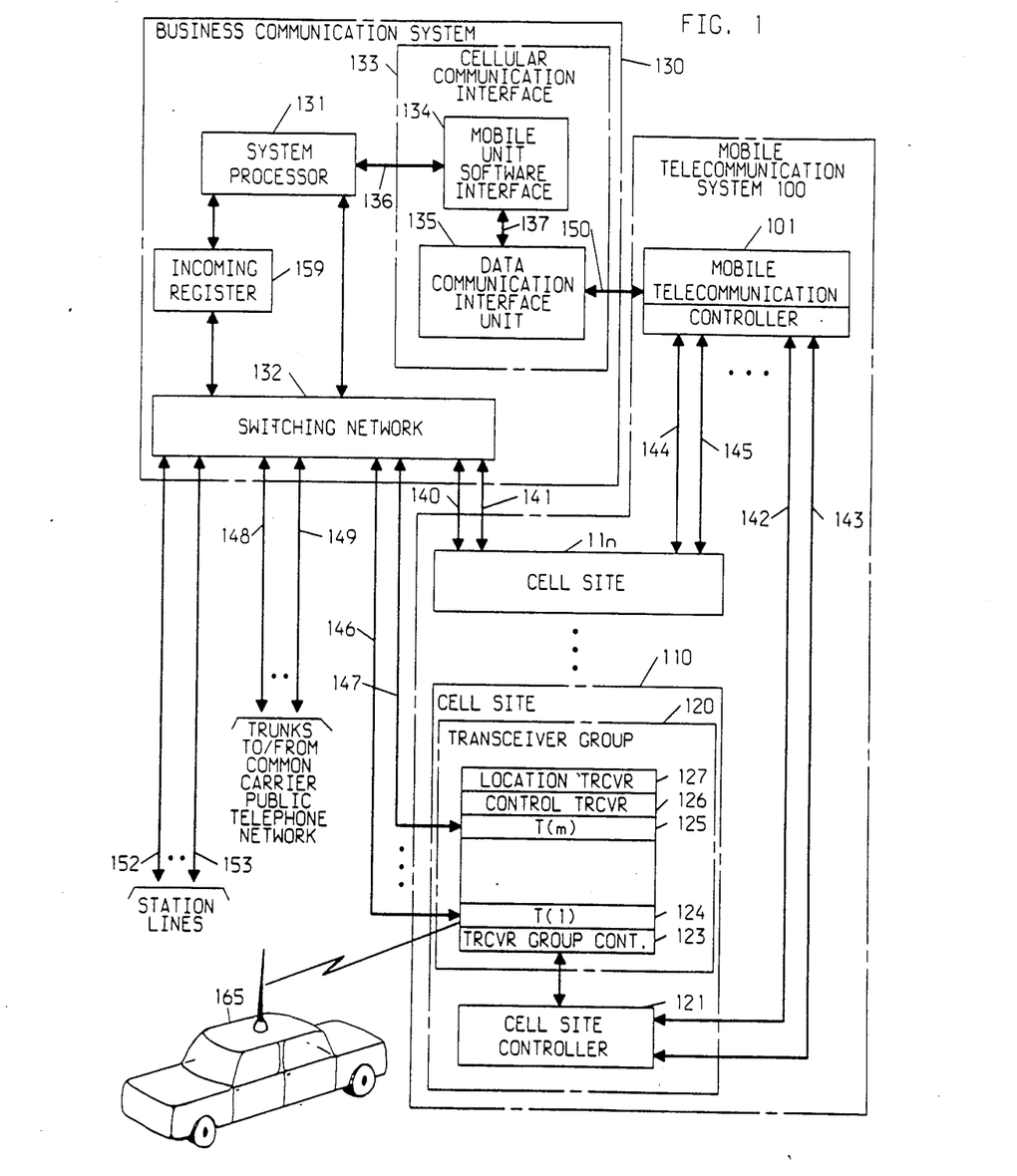
FIG. 1 is an overall block diagram of the subject communication system.

FIG. 1 illustrates a block diagram of the subject cellular mobile communication system. The system includes a business communication system 130, a mobile telecommunication controller 101, and a group of cell sites 1, ..., n. Calls come into business communication system 130 from a common carrier public telephone network and are connected through business communication system 130 to one of station lines 152, 153 if the call is to a telephone station set served by business communication system 130 or to one of communication links 140, 141, 146, 147 (not 142-145) which are terminated on cell sites 110-11n if the call is to a mobile unit such as 165. At the cell site (ex 110), each communication link 146 is connected to a transceiver T(1) which communicates with a mobile unit 165 over a radio channel. The cell sites 110-11n operate under the control of the mobile telecommunication controller 101 from which they receive commands over a group of data links 142, 143, 144, 145. The mobile telecommunication controller 101 and business communication system 130 also communicate over a data link 150, and cellular communication interface 133 to cooperate in setting up connections between a mobile unit 165 and the common carrier public telephone network.

Business communication system 130 is connected to the common carrier public telephone network by a group of communication links 148 ... 149. The communication links 148, 149 to the common carrier public telephone network are commonly called trunks and are so called in the Detailed Description and Figures. Business communication system 130 is also connected to groups of communication links such as 140, ... ,141 and 146, ... ,147, each of which groups of communication links connect business communication system 130 to one of the cell sites 110-11n. Some or all of the communication links and trunks described herein may be channels on a multiplexed facility. Business communication system 130 is controlled by system processor 131. System processor 131 is connected to data link 150 via cellular communication interface 133 in order to communicate with mobile telecommunication controller 101.

Cellular Communication Interface

Almost all station features in a business communication system make use of a fixed set of basic call processing routines. These call processing routines are:

(1) Request for Service
(2) Digit Collection
(3) Digit Sending
(4) Network Operations (add/remove from voice path)
(5) External Operations (ringing, station lamps)
(6) Disconnect All of these call processing routines (except Network Operations) rely on changes in status memory to perform their respective functions. For example, a request for service is detected when there is a change in the onhook/off-hook memory word of status memory associated with a particular telephone station set. The changes to status memory are done by various software routines which scan the physical state of each trunk circuit and telephone station set in the business communication system and which update status memory accordingly. These changes in status memory are then scanned by the basic call processing routines, which respond to these changes by providing the requested service.

Thus, mobile unit software interface 134 in cellular communication interface 133 creates "status changes" as a result of messages from mobile telecommunication controller 101 to make the presence of the mobile units transparent to the call processing in the business communication system. By doing so, all the business communication features become available to each mobile unit. This transparency is achieved by creating a "pseudo-station" number for each mobile unit and performing the station scanning of the mobile unit pseudo-stations as with the regular business communication system station lines. The status memory for these pseudo-stations is populated with data by message handler software in mobile unit software interface 134 that will be described in detail below. In general, the message handler software translates the messages from mobile telecommunication controller 101 into call processing activity in the basic call processing routines used by system processor 130. This activity results in status changes which mobile unit software interface 134 loads into status memory. The basic call processing routines of system processor 130 then respond to the status changes to provide the service requested.

Thus, cellular communication interface 133 integrates the operation of the mobile telecommunication system and the business communication system without requiring significant modification to either system.

Business communication system 130, cell sites 110 . . . 11n and mobile telecommunication controller 101 of the exemplary embodiment of the present invention are all commercially available units. It is therefore unnecessary to describe the internal operation of these units in detail. This description will concentrate on the interface between mobile telecommunication controller 101 and business communication system 130 and the actions taken in cell sites 110 . . . 11n, business communication system 130 and mobile telecommunication controller 101 in response to various call processing operations.

Business Communication System

Modern program-controlled business communication systems are programmed to set up connections, to generate and transmit messages, and to receive and interpret messages. The process of setting up connections is described, for example, in the BSTJ, Vol. 43, No. 5, Parts 1 and 2, September 1964, pp. 1831-2609, and is well known in the art. One type of operating system, typical of those well known in the art, which can be used to generate, interpret, transmit and receive data messages is the DMERT system described in the BSTJ, Vol. 62, No. 1, Part 2, January 1983, pp. 167-415. When a connection is requested via an incoming data message, it is a straightforward matter using existing well known program techniques to interpret this message and initiate the setting up a connection and transmit a message containing this data to another processor to set up such a connection. Thus, business communication system 130 may be any commercially available modern program-controlled switching system capable of performing all normal required telephone functions and able to generate, transmit, and receive data messages. Note that FIG. 1 shows only the parts of business communication system 130 necessary for an understanding of the present invention.

The business communication system used in this embodiment of the present invention is an AT&T System 85 switch, manufactured by AT&T Information Systems Inc. The switch has been adapted to exchange control messages with mobile telecommunication controller 101 and to respond to such messages. This adaptation has been accomplished with little effort, and other modern switches can readily be similarly adapted, using program techniques well known in the art, by utilizing the existing programs required for basic call processing and message processing purposes which are provided with commercially available business communication systems.

Mobile Telecommunication System

Mobile telecommunication controller 101, the data links interconnecting mobile telecommunication controller 101 and cell sites 110 . . . 11n, the cell site controllers 121 and transceiver group controllers 123 form a mobile telecommunication control complex and combine to control connections between a mobile unit 165 and the communication links 148 . . . 149 connected to business communication system 130.

Control messages are exchanged within the mobile telecommunication control complex between mobile telecommunication controller 101 and the cell site controllers such as cell site controller 121. In the present embodiment of the invention, the cell sites are commercially available cell sites of the type used in the Autoplex TM 100 System manufactured by AT&T Technologies, Inc. Other commercially available cell sites generally similar in operation to those described in the previously cited January 1979 issue of the BSTJ could also be used.

Cell sites 110, . . . , 11n are all similar. For convenience, details of only one of the cell sites, cell site 110, are shown. Similarly, only one mobile unit, mobile unit 165, near cell site 110, is shown, out of a large number of mobile units, groups of which are near each of the cell sites 110, . . . , 11n. Cell site 110 sets up and controls the switchable connections between communication links 146,...,147, and nearby mobile units, such as mobile unit 165. Cell site 110 includes a cell site controller 121 which is connected by data links 142, 143 to mobile telecommunication controller 101. Cell site controller 121 is a commercially available microprocessor such as the Intel Corporation model 8086. Cell site 110 also includes a group of transceivers 124, . . . , 125, a control transceiver 126, and a location transceiver 127, all under the control of one or more transceiver group controllers such as transceiver group controller 123. Transceiver group controller 123 is a simple commercially available microprocessor such as the WE ® 8000 microprocessor sold by AT&T Technologies, Inc. Tranceivers 124, . . . , 125, each communicate via a radio channel with a mobile unit, such as mobile unit 165. The transceiver group controllers 123 operate under the control of cell site controller 121. The transceivers in cell site 110 are connected to communication links 146, . . . , 147 which are connected to business communication system 130.

Mobile telecommunication controller 101 is a program-controlled processor, which may be one of several commercially available processors, plus a group of data link controllers. In this embodiment, a 3B 20D computer, manufactured by AT&T Technologies, Inc., described in the *Bell System Technical Journal*, Vol. 62, No. 1, Part 2, January 1983, pp. 167–415, is used.

The messages exchanged between mobile telecommunication controller 101 and cell sites 110 . . . 11n in this exemplary embodiment, i.e., within the mobile telecommunication control complex, are mainly the same messages which are exchanged in the previously cited Advanced Mobile Phone Service system. These messages have been extensively described in the previously cited January 1979 issue of the BSTJ and are not described in detail herein. However, those messages between cell sites 110, . . . 11n and the mobile telecommunication controller 101 used for vehicle location are modified and enhanced from those described in the previously cited BSTJ articles in accordance with an improved arrangement disclosed in U.S. Pat. No. 4,475,010, issued Oct. 2, 1984, to G. D. Huensch et. al. In accordance with that improved arrangement, vehicle location is accomplished under the control of the cell site controllers, communicating among themselves via data messages. After a mobile unit has been located, a request message is sent from a controlling cell site to mobile telecommunication controller 101 to request a hand-off of a mobile to one of an ordered list of designated candidate transceiver groups. Each transceiver group may include all communication transceivers of a cell site or only those connected to a particular directional antenna.

In accordance with the present invention, further data messages are exchanged over the data link 150 and cellular communication interface 133 between mobile telecommunication controller 101 and system processor 131. It is these messages which permit the two controllers to cooperate in setting up connections between a mobile unit and the telecommunication network.

Incoming Call to Mobile Unit

The operation of the exemplary embodiment of the invention is illustrated with respect to FIG. 1 using an incoming call to mobile unit 165 from a calling party on incoming trunk 149 which is connected to the common carrier public telephone network. The incoming call is received in business communication system 130 in well-known fashion. Incoming trunk 149 is initially connected to an incoming register 159 through switching network 132. System processor 131 accesses incoming register 159 to obtain the incoming digits received. Cellular communication interface 133 then translates the received incoming digits into the identity of the called mobile unit, which identity is transmitted to mobile telecommunication controller 101 by cellular communication interface 133.

In response to these incoming dialed digits, mobile telecommunication controller 101 first checks to make certain that called mobile unit 165 is not busy. If called mobile unit 165 is busy, station busy status information (described hereafter) is sent back to system processor 131 over data link 150. Business communication system 130 is equipped with sources of tone (not shown) connected to switching network 132. In response to station busy status information, system processor 131 causes busy tone to be applied to incoming trunk 149 to inform the calling party that called mobile unit 165 is busy.

If called mobile unit 165 is not busy, mobile telecommunication controller 101 sends station idle status information (described hereafter) to business communication system system processor 131. In response to the reception of this station idle status information, system processor 131 causes audible tone to be applied via switching network 132 to incoming trunk 149 to inform the calling party on incoming trunk 149 that called mobile unit 165 is being paged. Meanwhile, mobile telecommunication controller 101 sends a data message via data links such as 142, . . . , 145 to all those cell sites 110, . . . 11n under the control of mobile telecommunication controller 101 that are equipped with a paging transmitter requesting that they page called mobile unit 165. Cell sites 110, . . . 11n respond to the page request by paging called mobile unit 165 in a well known manner described, for example in Z. C. Fluhr et al.: Control Architecture, BSTJ, V. 58, No. 1, part 3, January 1979, pp. 43–69.

Mobile Unit Paging

All mobile units have standard equipment for use with cellular mobile systems. In response to the paging signals, called mobile unit 165 detects that it is being paged and sends a page response over the transmit access channel corresponding to the strongest receive access channel. This page response is received in a control transceiver such as control transceiver 126 at the cell site (110) which transmitted the strongest access channel signal and from then on controls called mobile unit 165. That cell site, cell site 110 in this case, sends a message via data link 142 notifying mobile telecommunication controller 101 that called mobile unit 165 has responded to the page. Mobile telecommunication controller 101 selects an idle transceiver, in this case, transceiver 124. Mobile telecommunication controller 101 then sends a message to cell site controller 121 of cell site 110 requesting that transceiver 124 be made active and that a command be sent to called mobile unit 165 to tune to the frequency pair associated with selected transceiver 124.

In response to the message to cell site controller 121, transceiver 124 is made active. Control transceiver 126, under the control of transceiver group controller 123, sends a tuning control message to called mobile unit 165 to tune the mobile unit to the same frequency pair as transceiver 124. The tuning control message is effectively part of an interconnecting means, causing a tunable radio to connect the customer to the selected transceiver which is connected by a communication link to business communication system 130. Here, the tuning action connects mobile unit 165 to transceiver 124; transceiver 124 is connected to communication link 146, which is connected to switching network 132 of business communication system 130. As a result of these actions, called mobile unit 165 is connected via a radio channel to communication link 146.

As mentioned previously, in this embodiment of the invention, all of the actions involved in paging or locating the called mobile unit, selecting a transceiver, and tuning the mobile unit are performed basically as described in the previously cited January, 1979 issue of the BSTJ and in the previously cited U.S. Pat. No. 4,475,010.

Mobile Unit Responds to Page

When mobile unit 165 has been tuned to the frequency pair of transceiver 124, transceiver 124 sends an alert signal to mobile unit 165. When mobile unit 165 answers, mobile telecommunication controller 101 is notified by a message from cell site controller 121. Mobile telecommunication controller 101 then sends communication link busy status information (described hereafter) to system processor 131. In response to the communication link busy status information, system processor 131 causes a connection to be set up in switching network 132 of business communication system 130 between incoming trunk 149 and communication link 146 which is now connected to called mobile unit 165 via transceiver 124.

A calling party disconnect of the incoming call is detected in business communication system 130; a called party disconnect is detected in controlling cell site 110. If the disconnect is detected in business communication system 130, system processor 131 updates the communication link busy status information which is detected by mobile telecommunication controller 101. In response to such a status update, mobile telecommunication controller 101 sends a message via data link 142 to cell site 110 to turn off the transceiver (124) which handled this call. Mobile telecommunication controller 101 then provides communication link idle status information to system processor 131 to request that the connection between communication link 146 and the connected incoming trunk be torn down.

To understand the operation of the Cellular Communication Interface (CCI) the following detailed description of the processing of a call from an incoming trunk to a mobile unit is described below.

Detailed Description of Cellular Communication Interface

The call processing software of business communication system 130 runs on a general purpose computer, system processor 131, which uses a periodic task driven operating system. The scan tasks are the periodic tasks most relevant to this description. There are two types of scan tasks which are used by cellular communication interface 133: change detection tasks and change processing tasks. The change detection tasks are software routines which detect changes in the physical states of the trunk circuits (148-149) and station lines (152-153) served by business communication system 130. The change detection tasks report these changes in physical state by altering the system status data stored in status memories 321-326 for the corresponding changed trunk circuits/station lines. The change processing tasks respond to these recorded status changes to determine the current state of the trunk circuits/station lines and identify what service is requested. System processor 131 then flows control from the change processing task to the identified feature software routine. Once the requested service is provided by the selected feature software routine, control is returned to the operating system in system processor 131 so that the operating system can return to the scan tasks.

Status Memory

The present state of all circuits (lines and trunks) served by business communication system 130 resides in a common data area which is accessed by all the scan tasks. This common data area is a memory whose addresses correspond to the assigned trunk/station numbers. This memory contains a number of data fields associated with each address, each of which data fields correspond to an assigned characteristic or physical attribute of the particular identified circuit (ex: class of service, trunk group number, etc.) This common data area is shown schematically in FIG. 3 as a number of status memories 321-326 each of which contains data fields for all of the circuits served by business communication system 130. Such data fields are necessary for the operation of the corresponding feature component of the call processing software (311-316). The data in status memories 321-326 is updated by the appropriate scan tasks as changes are detected and requests for service are processed.

Figure 2:
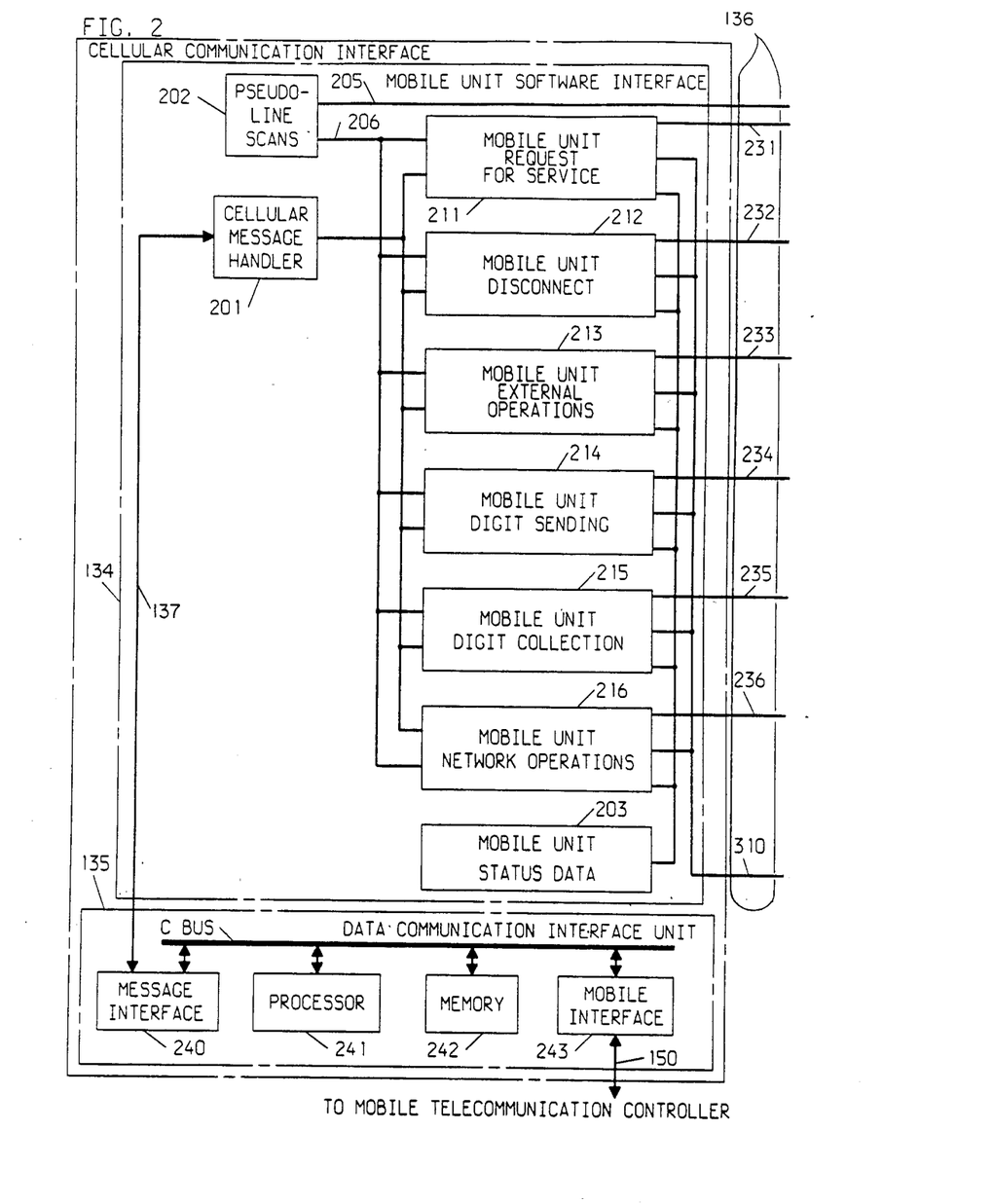
FIGS. 2 and 3 illustrate additional detail of the interface between the mobile communication system and the business communication system.
Figures 3, 4:
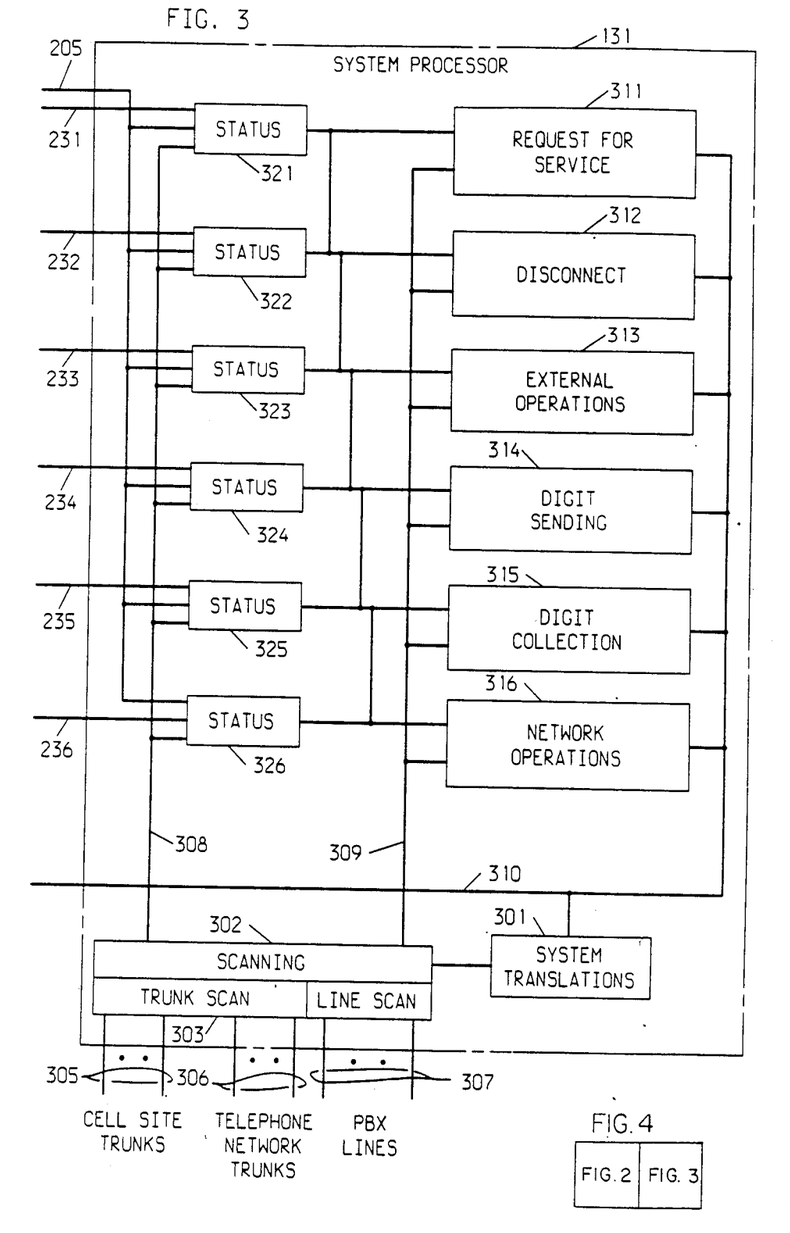
FIG. 4 illustrates the manner in which FIGS. 2 and 3 should be interconnected.

To minimize the impact of cellular communication interface 133 on the existing business communication system feature software, the order of execution of the scan tasks is that the mobile units are scanned before the trunk circuits/station lines served by business communication system 130. Thus, pseudo line scan software 202 is activated before line scan software 304 and trunk scan software 303. In this fashion the mobile unit activity is processed by cellular communication interface 133 operating with system processor 131 and all mobile unit change processing is completed before the existing call processing software in system processor 131 begins its routine line/trunk scanning task. Therefore, the existing call processing software in system processor 131 need not be modified because the only status changes detected by the call processing software are status changes relating to the lines and trunks served by business communication system 130. This includes the mobile unit pseudo lines whose unique characteristics are masked by the operation of mobile unit software interface 134 before the existing call processing software is activated. In similar fashion, the feature software such as request for service software 211 and request for service software 311 operate on a mobile unit first basis.

Incoming Trunk Call to Mobile Unit

If we return to the above-mentioned incoming call to business communication system 130, trunk scan software 303 detects the existence of the incoming call as the result of scanning the trunk busy/idle leads 306 for each of common carrier public telephone network trunks 148-149. This change in physical state of an associated trunk (ex. 148) is communicated to request for service software 311 by trunk scan software 303 setting the appropriate status bit in status memory 321 corresponding to the identity of active incoming trunk 148. This trunk identity information is obtained from the section of memory labeled "system translations 301". The system translation memory 301 contains data which identifies the correspondence between a physical trunk circuit and the designated trunk group/station number, class of service, type of equipment. System translation memory 301 also contains all the data which identifies the correspondence between the mobile units and pseudo station numbers. The data in system translation memory 301 is input by the business communication system administrator in well-known fashion whenever new stations are added or there are changes in existing station characteristics. Thus, trunk scan software 303 accesses system translation memory 301 to obtain information which identifies the type of incoming trunk circuit serving the incoming call, the identity of the trunk group and the class of service assigned to this trunk. This data is used by trunk scan software 303 to populate the data field in status memory 321 corresponding to incoming trunk 148.

Request for service software 311 periodically scans the data in status memory 321 and, in response to the new data stored therein for the incoming trunk (148) serving the incoming call, determines what type of service is being requested by comparing the status change information stored in status memory 321 with a state table description of trunk operation. Request for service software 311 in this case receives status change information consisting of a set of state changes indicating that incomming trunk 148 has been seized by the common carrier public telephone network. Request for service software 311 determines that this is an incoming call to business communication system 130 and that incoming dialed digits are to be received. Request for service software 311 passes control to digit collection software 315 by setting a status bit in status memory 325 corresponding to the address of incoming trunk 148 to indicate that digits are being dialed on incoming trunk 148. The operating system sequentially passes control from feature element to feature element until all feature elements have been sequentially enabled. On this incoming call, when digit collection software 315 is activated by the operating system, it detects the above described change in status memory 325 and then periodically scans identified incoming trunk 148 to collect the digits transmitted by the calling party. Digit collection software 315 determines when a complete number has been dialed and stores the dialed number and the dialing complete indicator in status memory 321.

Request for service software 311, when next periodically activated by the operating system, responds to this change in status memory 321 by identifying the information stored in status memory 321 as the dialed digits of a trunk to station call. Request for service software 311 scans the busy status data field of status memory 321 to determine whether this call can be completed. Assume for the purpose of this description that the called station is mobile unit 165 (listed in status memory 321 as a pseudo station) and that it is in an idle state. Request for service software 311 then activates the call completion software by setting a status bit in status memory 323 to indicate to external operations software 313 to apply a ringing signal to the pseudo station representing called mobile unit 165. Since the called station is a mobile unit, this mobile unit will have assigned to it a pseudo line number. Therefore, external operations software 313 in scanning status memory 323 would attempt to apply ringing to a non-existent station, the pseudo station for mobile unit 165.

As mentioned above, the mobile unit software scans (211-216) occur before the standard call processing scans (311-316) in system processor 131. Therefore, status memory 323 is scanned by mobile unit external operations software 213 before the standard external operations software 313 is activated. Mobile unit external operations software 213 scans only the pseudo station numbers in status memory 323, detects the status change in status memory 323 and immediately clears this change to mask it from external operations software 313. Mobile unit external operations software 213 generates a mobile unit page request for transmission to mobile telecommunication controller 101 indicating that called mobile unit 165 must be paged. External operations software 213 originates a page request by accessing system translations memory 301 to obtain the correspondence between the dialed number stored in status memory 323 and the identity of mobile unit 165. Cellular message handler software 201 formats this identity into a standard page request control message which is transmitted to message interface 240 of data communication interface unit 135.

Data Communication Interface Unit

The general structure of data communication interface unit 135 is illustrated in FIG. 2 in block diagram form. This circuit is a data transfer arrangement which funtions to transmit messages between a main memory and a communication channel. Such circuits are well known and one such arrangement is disclosed in U.S. Pat. No. 4,133,030, issued Jan. 2, 1979, to R. E. Huettner et al. The Huettner patent describes a block transfer arrangement but the concepts taught therein are applicable to the message transmission arrangement of data communication interface unit 135. The operation of data communication interface unit 135 is controlled by processor 241 which is programmed by software stored in memory 242. Processor 241 responds to a message arriving at either message interface 240 from cellular message handler 201 or at mobile interface 243 from mobile telecommunication controller 101 by reading the message from the receiving interface circuit on the common bus (CBUS). This message is routed by processor 241 from the receiving interface circuit to the interface circuit that serves the intended destination.

Page and Page Answer

The page request message described above is stored in message interface 240. Processor 241 transfers the page request message transfers over CBUS to mobile interface 243 which transmits this message to mobile telecommunication controller 101 via data link 150. This page request message causes mobile telecommunication controller 101 to page mobile unit 165 as described above. When mobile unit 165 answers this page, mobile telecommunication controller 101 generates a page answer message indicating that mobile unit 165 has answered the page and identifies the cell site (110) which serves mobile unit 165. This page answer message is transmitted by mobile telecommunications controller 101 to mobile interface 243 of data communication interface unit 135 via data link 150. Processor 241 transfers this received page answer message over CBUS to message interface 240 where cellular message handler 201 retrieves the stored page answer message. Cellular message handler 201 decodes the page answer message and translates the received information into pseudo station status changes so that call processing can continue processing on this incoming call. Cellular message handler 201 inputs data into status memory 321 at the pseudo line number address of mobile unit 165, indicating the identity of the cell site 110 serving mobile unit 165 and that the page was answered by mobile unit 165.

Mobile unit request for service software 211, as mentioned above, is activated before the standard call processing request for service software 311. Therefore, mobile unit request for service software 211 scans all the pseudo station numbers in status memory 321, detects these changes in status memory 321 and obtains translation information from system translation memory 301. The translation information obtained is a conversion of the cell site identification number (110) to a trunk group number identifying the communication links 145, 147 that interconnect business communication system 130 with cell site 110. Mobile unit request for service software 211 uses the trunk group number to locate an idle communication link in this trunk group by checking the trunk busy/idle status in status memory 321. Mobile unit request for service software 211 then inputs the trunk number into status memory 326 to indicate that this idle communication link (146) in the trunk group must be seized. When the operating system in system processor 131 reaches network operations software 316 in the normal sequencing of tasks, network operations software 316 detects this status change and in well known fashion seizes idle communication link 146 in the indicated trunk group to cell site 110. Communication link 146 is terminated on transceiver T(1) (124) in transceiver group 120 at cell site 110. Transceiver 124 is tuned to the radio frequency that mobile unit 165 is transmitting on. Thus, a communication connection is now established from business communication system 130 over communication link 146 to transceiver 124 and thence to mobile unit 165. Network operations software 316 then sets a status bit in status memory 323 associated with the seized communication link 146 to indicate that seized communication link 146 must have ringing applied to it.

Ringing and Ring Trip

Mobile unit external operations software 213 is next enabled in the sequencing of the operating system and generates a request to mobile telecommunication controller 101 indicating that mobile unit 165 must be rung. Cellular message handler 201 formats the mobile unit ring message and transmits same to mobile telecommunication controller 101 through data communication interface unit 135 as described above. Mobile telecommunication controller 101 responds to the mobile unit ring message by signaling cell site controller 121 in cell site 110 to ring mobile unit 165. Cell site controller 121 responds to the ring message by activating transceiver group controller 123 which enables transceiver 124 to signal mobile unit 165. When the called party at mobile unit 165 responds to the ringing signal by going "off-hook" at mobile unit 165, an answer supervision signal is transmitted by mobile unit 165 via transceiver 124 and transceiver group controller 123 to cell site controller 121. In response to the answer supervision signal, a mobile answer message is transmitted by cell site controller 121 to mobile telecommunication controller 101 via data links 142,143. This message is forwarded by mobile telecommunication controller 101 through data communication interface unit 135 to cellular message handler 201 where it is decoded. At the same time, mobile telecommunication controller 101 establishes a communication connection as described above from mobile unit 165 through transceiver 124 to seized communication link 146 which is connected to business communication system 130. Cellular message handler 201 translates the received mobile answer message into status memory changes and inputs the mobile unit ringing answer status into status memory 321 to indicate that a switching network connection must be established from incoming trunk 149 to seized mobile unit communication link 146 and audible ringback is removed from incoming trunk 148. Mobile unit request for service software 211 when activated by the operating system responds to the status memory change by removing audible ringback from incoming trunk 148 and activating switching network 132 to establish a communication connection from incoming trunk 148 to seized mobile unit communication link 146. Request for service software 311 then updates status memory 321 for both trunk 148 and communication link 146 to indicate a call complete talk state status.

Business Communication

The above description outlines the role of cellular communication interface 133 in integrating business communication system 130 and mobile telecommunication system 100. The description of an incoming trunk call illustrates the translations between the message-based signaling of mobile telecommunication system 100 and the status memory-based operation of business communication system 130. These translations by cellular communication interface 133 eliminate the need to make extensive changes to either system since the true identity of the mobile unit is hidden from the call processing software of business communication system 130. The following description of a call transfer from a mobile unit to a station line illustrates how the full complement of business communication features are available to mobile units.

Assume that the above-described incoming trunk call to mobile unit 165 is presently in the talk state. Assume that the called party at mobile unit 165 wishes to transfer this call to another subscriber at a telephone station set (not shown) served by station line 152. To accomplish this transfer in a standard business communication system, the called party simply flashes the switchhook of the telephone station set, receives dial tone, then dials the number of the third party. The business communication system then adds the third party to the call connection while the incoming trunk is placed on hold. The third party is directly connected to the incoming trunk once the called party goes on-hook.

The transfer feature works in an identical fashion in the subject system when the called party is a mobile unit. In particular, mobile unit 165 is connected via transceiver 124, communication link 146 and switching network 132 to incoming trunk 148. To initiate a call transfer operation, the called party at mobile unit 165 flashes the switchhook. Mobile unit 165 transmits a switchhook flash indication via transceiver 124 and transceiver group controller 123 to cell site controller 121. The switchhook flash indication is converted into a switchhook flash message by cell site controller 121, which message is transmitted via data links 142,143 to mobile telecommunication controller 101. The switchhook flash message is forwarded by mobile telecommunication controller 101 via data link 150 to mobile interface 243 of data communication interface 135. As described above, processor 241 transfers this received switchhook flash message from mobile interface 243 to message interface 240 where it is retrieved by cellular message handler 201. Cellular message handler 201 decodes the switchhook flash message, converts it into status changes and inputs these changes into status memory 321 in the address location corresponding to the pseudo station number of mobile unit 165.

Since mobile unit request for service software 211 is activated before request for service software 311 and the status changes are stored in a pseudo station number address location, the call processing routines of system processor 131 cannot access this status change data or serve the call transfer request in the present state. Mobile unit request for service software 211 is activated by the operating system, scans all pseudo station numbers in status memory 321 and detects the switchhook flash status of mobile unit 165. Mobile unit request for service software 211 recognizes this switchhook flash state as a call transfer request and requests the operating system to pass control of this call to the standard call transfer feature software.

The standard call transfer call processing of system processor 131 now is activated in well-known fashion to place incoming trunk 148 on hold and receive dialed digits from the called party, in this case communication link 146.

Call Transfer-Dialing

The standard call transfer call processing routine begins the call transfer operation by placing the incoming trunk 148 on hold. This is accomplished by using network operations software 311 to remove incoming trunk 148 from its present talking connection. The standard call transfer call processing routine next provides dial tone to mobile unit 165 and collect whatever digits are dialed. This is accomplished by network operations software 316 connecting a dial tone circuit (not shown) to the mobile unit's physical appearance (communication link 146) in switching network 132 and writing a dialing state status in the address space of communication link 146 in status memory 325. When digit collection software 315 is next activated by the operating system, it detects this dialing status and periodically scans communication link 146 to detect and collect whatever digits are dialed.

The called party at mobile unit dials the station number of the subscriber who is served by station line 152. These dialed digits are transferred by mobile unit digit collection software 215 via cellular message handler 201 along with a dialing complete status to status memory 325 in the address space assigned to communication link 146.

Digit collection software 315, when next activated by the operating system, scans status memory 325, detects these status changes and advances to the operating system to cause request for service software 311 to connect communication link 146 to the station line designated by the dialed digits. This is accomplished by request for service software 311 connecting an audible ringback tone circuit (not shown) to communication link 146 and writing a ring line status into status memory 323. Network operations software 313, when next activated by the operating system, detects this status change and activates ringing on the called station line 152. When the subscriber at station line 152 answers, audible ringback is removed from the calling party (communication link 146) and the calling party station line 152 are connected in well known fashion by switching network 132. To complete the transfer, the subscriber at mobile unit 165 hangs up. When mobile unit disconnect software 212 receives a "mobile idle" message from mobile telecommunication controller 101 via cellular message handler 201, it advances to the operating system to invoke the final portion of the standard call transfer call processing routine. This routine removes the original called party (communication link 146) from the call connection and connects calling party (incoming trunk 148) and station line 152.

Thus, aside from the translations provided by cellular communication interface 133, the standard call transfer service is provided by the unmodified call processing software of business communication system 130. In similar fashion, all business communication features of business communication system 130 can be provided to the mobile units served by mobile telecommunication system 100.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A mobile telecommunication complex for providing business communication services to mobile telephone units comprising:

a mobile telecommunication system which provides mobile telecommunication services to one or more mobile telephone units;

a business communication system, including a system processor which controls the operation of said business communication system in response to station status activity associated with a call connection stored therein, for providing business communication services to communication circuits connected to said business communication system;

one or more communication links connecting said mobile telecommunication system and said business communication system for carrying voice communication signals therebetween;

one or more data links connecting said business communication system and said mobile telecommunication system for carrying data therebetween;

wherein said mobile telecommunication system is responsive to control messages from any one of said mobile telephone units for establishing a communication connection between said mobile telephone unit and one of said communication links and for transmitting a control message to said business communication system via one of said data links describing the state of the call connection on said communication link connected to said one mobile telephone unit;

cellular communication interface means connected between said data links and said system processor for converting said control message from said mobile telecommunication system to station status activity data associated with said call connection, which station status activity data is written by said interface means into said business communication system; and wherein said system processor is responsive to said station status activity data for providing business communication service to said communication link associated with said one mobile telephone unit.

2. A mobile telecommunication complex for providing business communication services to mobile telephone units comprising:

a mobile telecommunications system which provides mobile telecommunication services to one or more mobile telephone units;

a business communication system including a system processor which controls the operation of said business communication system in response to station status activity associated with a call connection stored therein, for providing business communication services to communication circuits connected to said business communication system;

one or more communication links connecting said mobile telecommunication system and said business communication system for carrying data and voice communication signals therebetween;

wherein said mobile telecommunication system is responsive to control messages from any one of said mobile telephone units for establishing a communication connection between said mobile telephone unit and one of said communication links and for transmitting a control message to said business communication system via one of said communication links describing the state of the call connection on said communication link connected to said one mobile telephone unit;

cellular communication interface means connected between said communication links and said system processor for converting said control message from said mobile telecommunication system to station status activity data associated with said call connection, which station status activity data is written by said interface means into said business communication system; and wherein said system processor is responsive to said station status activity data for providing business communication service to said communication link associated with said one mobile telephone unit.

3. The mobile telecommunication complex of claims 1 or 2 wherein each of said mobile telephone units are assigned a pseudo station number in said business communication system, including:

means in said business communication system for storing by station number said station status activity data;

means in said cellular communication interface means for translating said control message into station status activity data; and means in said cellular communication interface means responsive to said translated station status activity data for storing said translated station status activity data in said storing means in an address location corresponding to the pseudo station number of said one mobile telephone unit.

4. The mobile telecommunication complex of claim 3 including:

means in said cellular communication interface means responsive to said system processor writing station status activity data in said storing means corresponding to station signalling data for a pseudo station number for changing said pseudo station number station status activity data to prevent said business communication system from signalling said pseudo station; and means in said cellular communication interface responsive to said changing means for transmitting control signals to said mobile telecommunication system to signal said mobile telephone unit corresponding to said pseudo station number.

5. The mobile telecommunication complex of claim 3 including:

means in said cellular communication interface means responsive to said system processor writing station status activity data in said storing means corresponding to a switching network connection request to a pseudo station number for altering said station status activity data to correspond to a switching network connection request to the communication link connected to the mobile telephone unit corresponding to said pseudo station number.

6. A mobile telecommunication complex for providing business communication services to mobile telecommunication units comprising:

a mobile telecommunication system for providing mobile telecommunication service to one or more mobile telecommunication units comprising:

at least one cell site means for communicating with said mobile telecommunication units, at least one mobile telecommunication controller connected to said cell site means for controlling communication connections between said cell site means and said mobile telecommunication units;

a business communication system for providing business communication services to communication circuits connected thereto comprising:

switching network means connected to said communication circuits for establishing communication connections therebetween, system processor means responsive to service request signals received from any one of said communication circuits for controlling the operation of said switching network means to provide the requested service to said communication circuit;

a plurality of communication links connected between said cell sites and said switching network for carrying voice communications between mobile telecommunication units served by said cell sites and said switching network means;

a plurality of data links connecting said mobile telecommunication controller and said system processor means for carrying data describing mobile telecommunication unit activity therebetween;

cellular communication interface means connected between said data links and said system processor means for translating said mobile unit activity data describing a request for service from one of said mobile telecommunication units to service request signals associated with a selected one of said communication links which serves said one mobile telecommunication unit;

wherein said system processor is responsive to said service request signals for providing the requested service to said selected communication link.

7. A mobile telecommunication complex for providing business communication services to mobile telecommunication units comprising:

a mobile telecommunication system for providing mobile telecommunication service to one or more mobile telecommunication units comprising:

at least one cell site means for communicating with said mobile telecommunication units, at least one mobile telecommunication controller connected to said cell site means for controlling communication connections between said cell site means and said mobile telecommunication units;

a business communication system for providing business communication services to communication circuits connected thereto comprising:

switching network means connected to said communication circuits for establishing communication connections therebetween, system processor means responsive to service request signals received from any one of said communication circuits for controlling the operation of said switching network means to provide the requested service to said communication circuit;

a plurality of communication links connected between said cell sites and said business communication system for carrying data and voice communications between mobile telecommunication units served by said cell sites and said business communication system;

cellular communication interface means connected between said communication links and said system processor means for translating data describing a request for service from one of said units to service request signals associated with a selected one of said communication links which serves said one mobile telecommunication unit;

wherein said system processor is responsive to said service request signals for providing the requested service to said selected communication link.

8. The mobile telecommunication complex of claims 6 or 7 wherein each of said mobile telecommunication units are assigned a pseudo station number in said business communication system, including:

means in said business communication system for storing by station number said station status activity data;

means in said cellular communication interface means for translating said control message into station status activity data;

means in said cellular communication interface means responsive to said translated station status activity data for storing said translated station status activity data in said storing means in an address location corresponding to the pseudo station number of said one mobile telecommunication unit.

9. The mobile telecommunication complex of claim 8 including:

means in said cellular communication interface means responsive to said system processor writing station status activity data in said storing means corresponding to station signalling data for a pseudo station number for changing said pseudo station number station status activity data to prevent said business communication system from signalling said pseudo station; and means in said cellular communication interface responsive to said changing means for transmitting control signals to said mobile telecommunication system to signal said mobile telecommunication unit corresponding to said pseudo station number.

10. The mobile telecommunication complex of claim 8 including:

means in said cellular communication interface means responsive to said system processor writing station status activity data in said storing means corresponding to a switching network connection request to a pseudo station number for altering said station status activity data to correspond to a switching network connection request to the communication link connected to the mobile telecommunication unit corresponding to said pseudo station number.

11. In a mobile telecommunication complex including a mobile telecommunication system which provides mobile telecommunication services to one or more mobile units, a business communication system which provides business communication services to communication circuits connected thereto, communication links connecting said mobile telecommunication system and said business communication system for carrying voice communications therebetween, data links connecting said mobile telecommunication system and said business communication system for carrying data describing mobile unit activity therebetween, a method for providing business communication services to said mobile units comprising the steps of:

transmitting from said mobile telecommunication system to said business communication system via said data links, data describing the activity of mobile units connected to said communication links;

converting, in said business communication system, said data to standard business communication system station service requests associated with a selected one of said communication links which is connected by said mobile telecommunication system to a requesting one of said mobile units;

providing said requested service in said business communication system to said selected communication link.

12. In a mobile telecommunication complex including a mobile telecommunication system which provides mobile telecommunication services to one or more mobile units, a business communication system which provides business communication services to communication circuits connected thereto, communication links connecting said mobile telecommunication system and said business communication system for carrying voice and data communications therebetween, a method for providing business communication services to said mobile units comprising the steps of:

transmitting from said mobile telecommunication system to said business communication system via said communication links, data describing the activity of mobile units connected to said communication links;

converting, in said business communication system, said data to standard business communication system station service requests associated with a selected one of said communication links which is connected by said mobile telecommunication system to a requesting one of said mobile units;

providing said requested service in said business communication system to said selected communication link.

13. In a mobile telecommunication complex including a mobile telecommunication system which provides mobile telecommunication services to one or more mobile units, a business communication system which provides business communication services to communication circuits connected thereto, communication links connecting said mobile telecommunication system and said business communication system for carrying voice communications therebetween, data links connecting said mobile telecommunication system and said business communication system for carrying data describing mobile unit activity therebetween, a method for providing business communication services to said mobile units comprising the steps of:
- assigning pseudo station numbers in said business communication system to each of said mobile units;
- transmitting from said mobile telecommunication system to said business communication system via said data links, data describing the activity of mobile units connected to said communication links;
- converting, in said business communication system, said data to standard business communication system station service requests associated with the one of said pseudo station numbers assigned to a requesting one of said mobile units connected to said communication links;
- translating said one pseudo station number to the identity of a selected communication link to which said requesting mobile unit is connected;
- providing said requested service in said business communication system to said requesting mobile unit connected to said selected communication link.

14. In a mobile telecommunication complex including a mobile telecommunication system which provides mobile telecommunication services to one or more mobile units, a business communication system which provides business communication services to communication circuits connected thereto, communication links connecting said mobile telecommunication system and said business communication system for carrying voice and data communication therebetween, a method for providing business communication services to said mobile units comprising the steps of:
- assigning pseudo station numbers in said business communication system to each of said mobile units;
- transmitting from said mobile telecommunication system to said business communication system via said communication links, data describing the activity of mobile units connected to said communication links;
- converting, in said business communication system, said data to standard business communication system station service requests associated with the one of said pseudo station numbers assigned to a requesting one of said mobile units;
- translating said one pseudo station number to the identity of a selected communication link to which said requesting mobile unit is connected;
- providing said requested service in said business communication system to said requesting mobile unit connected to said selected communication link.

* * * * *

UNITED STATES PATENT AND TRADEMARK OFFICE
CERTIFICATE OF CORRECTION

PATENT NO. : 4,680,786

DATED : July 14, 1987

INVENTOR(S) : Robin C. Baker, Steven E. Brown, John R. Lothrop, Roman Lozyniak, Paul E. Miller, Robert H. Olsen, Charles H. Parker, Eva C. Swoll It is certified that error appears in the above-identified patent and that said Letters Patent is hereby corrected as shown below:

Inventors should appear as:
Robin C. Baker
Steven E. Brown
John R. Lothrop
Roman Lozyniak
Paul E. Miller
Robert H. Olsen
Charles H. Parker
Eva C. Swoll Signed and Sealed this Twentieth Day of October, 1987

Attest:

DONALD J. QUIGG

Attesting Officer

Commissioner of Patents and Trademarks